United States Patent
Schreter (10) Patent No.: US 9,183,129 B2
(45) Date of Patent: *Nov. 10, 2015

(54) METHOD AND SYSTEM FOR MANAGING LARGE WRITE-ONCE TABLES IN SHADOW PAGE DATABASES

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,784

(22) Filed: Oct. 7, 2013

(65) Prior Publication Data

US 2014/0040590 A1    Feb. 6, 2014

Related U.S. Application Data

(63) Continuation of application No. 13/331,455, filed on Dec. 20, 2011, now Pat. No. 8,555,023, which is a continuation of application No. 12/437,240, filed on May 7, 2009, now Pat. No. 8,112,607.

(51) Int. Cl.
  *G06F 12/02* (2006.01)
  *G06F 3/06* (2006.01)
  *G06F 12/10* (2006.01)

(52) U.S. Cl.
  CPC .............. *G06F 12/023* (2013.01); *G06F 3/065* (2013.01); *G06F 12/1009* (2013.01)

(58) Field of Classification Search
  CPC .................................. G06F 3/065; G06F 3/067
  USPC .................................................. 711/170, 162
  See application file for complete search history.

(56) References Cited

U.S. PATENT DOCUMENTS

| | | | |
|---|---|---|---|
| 7,739,312 B2 | 6/2010 | Gordon et al. | |
| 7,783,610 B2 | 8/2010 | Lin et al. | |
| 7,827,201 B1 | 11/2010 | Gordon et al. | |
| 7,882,301 B2 | 2/2011 | Biswas et al. | |
| 8,112,607 B2 | 2/2012 | Schreter | |
| 8,555,023 B2 | 10/2013 | Schreter | |
| 2006/0053246 A1 | 3/2006 | Lee | |
| 2007/0192534 A1 | 8/2007 | Hwang et al. | |
| 2008/0040385 A1 | 2/2008 | Barrall et al. | |
| 2008/0270461 A1 | 10/2008 | Gordon et al. | |
| 2008/0275907 A1 | 11/2008 | Han et al. | |
| 2010/0153192 A1* | 6/2010 | Hamilton et al. | 705/13 |

(Continued)

OTHER PUBLICATIONS

"U.S. Appl. No. 12/437,240, Response filed Aug. 17, 2011 to Non Final Office Action mailed Jun. 30, 2011", 10 pgs.

(Continued)

*Primary Examiner* — Michael Tran
(74) *Attorney, Agent, or Firm* — Schwegman Lundberg & Woessner, P.A.

(57) ABSTRACT

Methods and systems for managing large write-once tables are described. In some embodiments, a relational database management system includes a space allocation module that utilizes both a logical space allocation scheme, as well as a physical space allocation scheme, to allocate space in units (e.g., pages) having two different sizes—small pages and big pages. For instance, small pages are logically allocated with a conventional converter module, which manages a converter table for mapping logical pages to physical pages, while big pages are physically allocated with an object directory manager, which manages big objects comprised of big pages.

19 Claims, 6 Drawing Sheets

(56) References Cited

U.S. PATENT DOCUMENTS

2010/0287346 A1 11/2010 Schreter
2012/0096040 A1 4/2012 Schreter
2013/0254504 A1* 9/2013 Saito et al. .................... 711/162

OTHER PUBLICATIONS

"U.S. Appl. No. 12/437,240, Non Final Office Action mailed Jun. 30, 2011", 9 pgs.

"U.S. Appl. No. 12/437,240, Notice of Allowance mailed Oct. 5, 2011", 6 pgs.

"U.S. Appl. No. 13/331,455, Non Final Office Action mailed Jan. 7, 2013", 6 pgs.

"U.S. Appl. No. 13/331,455, Notice of Allowance mailed Jun. 7, 2013", 6 pgs.

"U.S. Appl. No. 13/331,455, Response filed Apr. 8, 2013 to Non Final Office Action mailed Jan. 7, 2013", 12 pgs.

* cited by examiner

BIG OBJECT DIRECTORY TABLE

| FREE (0-7) PREVIOUSLY USED BY (2, 0, 0, 7) |||
|---|---|---|
| (0, 0, 8, 11) | (1, 2, 12, 13) | (0, 4, 14, 15) |
| (2, 8, 16 17) | (0, 6, 18, 21) | (1, 0, 22, 23) |
| FREE (24 – N) NOT YET USED |||

FREE BLOCK MANAGER (FBM) BITMAP

| S | S | S | S | S | S | S | S |
|---|---|---|---|---|---|---|---|
| U | U | U | U | U | U | U | U |
| U | U | U | U | U | U | U | U |
| F | F | F | F | F | F | F | F |

F = FREE SPACE
U = USED PAGES
S = FREE AFTER SAVEPOINT

METHOD AND SYSTEM FOR MANAGING LARGE WRITE-ONCE TABLES IN SHADOW PAGE DATABASES

RELATED APPLICATIONS

This application is a Continuation of U.S. application Ser. No. 13/331,455, filed on Dec. 20, 2011, which is a Continuation of U.S. application Ser. No. 12/437,240, filed on May 7, 2009, which applications are incorporated herein by reference in their entirety.

TECHNICAL FIELD

The present disclosure generally relates to relational database management systems. More specifically, the present disclosure relates to computer-implemented methods and systems for managing large write-once tables in database systems utilizing shadow paging techniques.

BACKGROUND

Relational database management systems typically utilize one of two space allocation techniques for data stored in database tables—physical allocation or logical allocation. In many database systems that utilize physical space allocation techniques, space is allocated in fixed-size chunks (often referred to as extents). After a fixed-size chunk of space has been allocated and data have been written to the allocated space, deleting portions of the data from the space does not automatically deallocate the space occupied by the deleted data. Consequently, deleting portions of the data does not make the space available to store other data. Instead, a reorganization operation must be performed to regain the free space occupied by the deleted data and to "clean up" the space. A reorganization operation generally must be planned and initiated by a database administrator, adding to the total cost of ownership for database systems that utilize physical space allocation techniques.

One of the primary advantages to using a logical space allocation technique is that reorganization operations are not necessary to reclaim previously allocated, unused space. For instance, with database systems that utilize logical space allocation techniques, such as the MaxDB database system available from SAP® AG, space is allocated in uniformly-sized units referred to as pages—typically with a page size in the range of 4 kilobytes to 64 kilobytes. After a page has been allocated and data have been written to the page, deleting all data in the page will automatically free the space occupied by the page, making the space available to store other data. It is not necessary to have an administrator perform a reorganization operation to manually reclaim the unused space. Consequently, when compared with database systems that use physical space allocation techniques, database systems that utilize logical space allocation techniques tend to require less administration and therefore have a lower total cost of ownership.

Database systems that implement logical space allocation techniques often utilize what is commonly referred to as a "converter" (sometimes referred to as a "converter page map" or "page converter") for mapping (e.g., converting) logical page addresses to physical page addresses. For instance, when an application initiates a write operation to write to an existing page, the write operation will specify a logical page address. A database system processing the write operation will refer to a converter map (e.g., a table), managed by the converter, to identify the physical page address associated with the logical page address referenced in the write operation. To avoid frequently and unnecessarily accessing secondary storage (e.g., magnetic or optical fixed-disks), database systems implement a data cache in memory for processing input/output operations. The converter map that maps logical page addresses to physical page addresses will typically occupy a portion of the data cache.

In addition to a converter, database systems that implement logical space allocation techniques often utilize a technique referred to as "shadow paging." Shadow paging is a copy-on-write technique for avoiding in-place updates of pages. For example, with shadow paging, when an application modifies an existing allocated page (e.g., by initiating a write operation to write data to the existing page), a new copy of the existing page is generated and assigned or mapped to the logical page. Accordingly, after a write operation to an existing page, the logical page associated with the existing page will be mapped to two different versions of the page—an old version (referred to as the "shadow page"), representing the state of the data prior to processing the write operation, and a new version, representing the state of the data after processing the write operation. The logical page is marked as "dirty" to indicate that the logical page is modified. Periodically, those logical pages marked as dirty are flushed (e.g., written from the data cache to secondary storage). After the old copy of the page—that is, the shadow copy of the logical page—is not needed anymore (e.g., after performing a savepoint operation), the old physical page is reclaimed by a free block manager, so it can be reused for new data.

With database systems that utilize shadow paging techniques, due to the converter (e.g., the converter map), which maps logical pages to physical pages, there is a memory overhead associated with the logical space allocation scheme described above. In general, the size of the converter map, and thus the amount of memory dedicated for the converter map, is directly dependent upon the overall size of the database. As an example, given a typical page size and converter structure in an existing database system, the memory overhead may be approximately one tenth of one percent (0.1%) of the total data volume of secondary storage (e.g., disks or solid state drives). Accordingly, for each one terabyte (1 TB) of data volume in secondary storage, there will be permanent memory overhead for the converter map of about one gigabyte (1 GB). As the converter map must be read into memory upon start up, the larger the converter map, the longer it will take the database system to initialize on start up. Nonetheless, given the size of a typical database (e.g., less than one terabyte (1 TB) in size), the size of the converter map is manageable.

In certain scenarios, for example, where a database is utilized to process and store hundreds of Terabytes of data, the corresponding size of the converter map becomes prohibitively large. For example, given the size ratio expressed above, a one hundred Terabyte (100 TB) database will require one hundred Gigabytes (100 GB) of memory—a prohibitively large requirement even for high-end systems. The large size requirement for the converter map is prohibitive both on the basis of the cost of memory, as well as the time it would take for the converter map to be read into memory on start up. Consequently, there is a desire and need for an alternative space allocation technique for use with database systems that use logical space allocation and shadow paging techniques for storing extremely large amounts of data.

SUMMARY

Methods and systems for managing large write-once database tables in a relational database management system are disclosed. Consistent with one embodiment, a relational database management system includes a space allocation module that utilizes both a logical space allocation scheme, as well as a physical space allocation scheme, to allocate space in units (e.g., pages) having two different sizes—small pages and big pages. For instance, consistent with one embodiment, small pages are logically allocated, while large pages are physically allocated. The space allocation module utilizes a converter module, which manages a converter table, to map (and convert) logical page addresses to physical page address. In addition, an object directory table is maintained to keep track of big pages that have been physically allocated. The space allocation module is configured such that the converter module and object directory manager are integrated and cooperate to allocate space in different sized units, while maintaining the advantages of the converter-based allocation scheme—specifically, a reorganization free system with a low total cost of ownership.

DESCRIPTION OF THE DRAWINGS

Some embodiments are illustrated by way of example and not limitation in the figures of the accompanying drawings, in which.

DETAILED DESCRIPTION

Methods and systems for allocating space in a database are described. In the following description, for purposes of explanation, numerous specific details are set forth in order to provide a thorough understanding of example embodiments of the present invention. It will be evident, however, to one skilled in the art that the present invention may be practiced without these specific details.

Consistent with embodiments of the invention, a relational database management system includes a space allocation module that allocates pages (e.g., units of space) in two different sizes, where pages allocated in a first size are allocated logically using a converter to map the logical page to the physical page, and pages allocated in a second size, which is greater than the first size, are physically allocated using a big object directory manager. Pages of the first size are referred to herein as "small pages," whereas pages of the second size are referred to herein as "big pages." The space allocation module (or in some implementations, modules) manages the available space on the storage device or devices by designating a first portion of the available space as a converter-managed space for use in storing small pages that are allocated with the use of the converter, and designating a second portion of the available space for storing big pages, allocated with the big object directory manager. In some implementations, the portions of available space referred to herein are separate volumes, such that some volumes will be designated for use with small pages, while other volumes will be designated for use with big pages. In one embodiment, the converter managed space is allocated as a single large container within the space managed by the big object directory manager. Additionally, the space allocation module includes a first free block manager to manage the allocation state of the small pages, and a second free block manager to manage the allocation state of the big pages.

Consistent with embodiments of the invention, the relational database management system maintains the advantages of a logical space allocation system (and technique)—specifically, a reorganization free system with fewer administrative requirements and a lower total cost of ownership—while simultaneously providing for the physical allocation of larger page sizes, thereby enabling the efficient storage of extremely large amounts of data in write-once database tables. Note that although big pages are physically allocated, they are still addressed logically via big object directory manager, thus not sacrificing reorganization freedom. For instance, by allocating two page sizes, the relational database management system provides the ability to allocate small pages for use with conventional database tables, which are typically written to, read from and updated over time, and the ability to allocate big pages for use in storing extremely large amounts of data in database tables that are written to once, but typically are not modified or updated. Such tables—referred to generally as write-once database tables—are well-suited for use with applications that need to store extremely large amounts of data that are being temporarily archived. For example, one such application that may benefit from using larger page sizes (e.g., big pages) is an application that archives radio frequency identification (RFID) event information read from a system of RFID readers. RFID applications often generate extremely large amounts of data. It may be desirable to store the data in such a manner that the data can be searched, but because the data need not be updated, the data can be most effectively stored in write-once tables. Of course, a variety of other applications may equally benefit.

Figure 1:
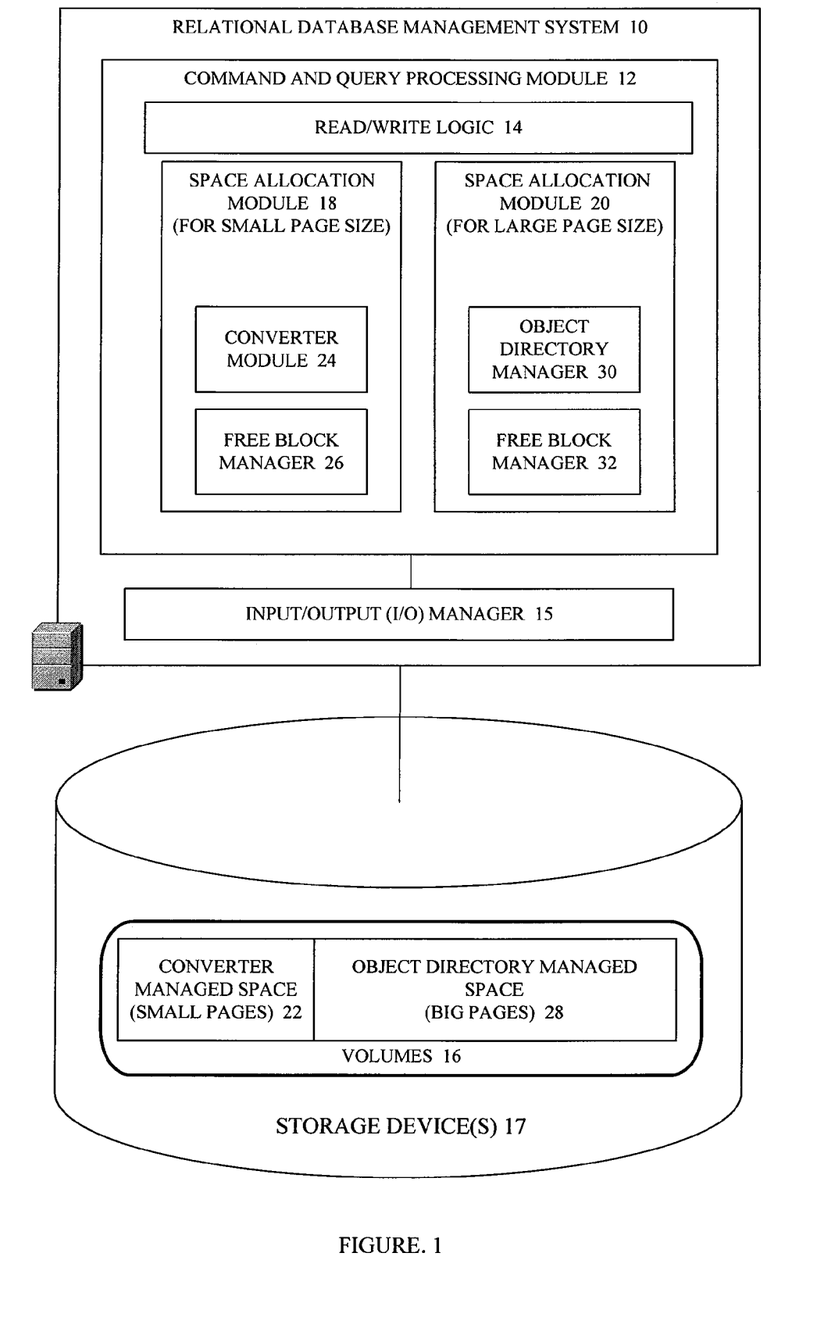
FIG. 1 is functional block diagram illustrating an example of the various functional components of a relational database management system consistent with an embodiment of the invention.

Turning now to a description of an example implementation, FIG. 1 is functional block diagram illustrating an example of the various functional components of a relational database management system consistent with one embodiment of the invention. As illustrated in FIG. 1, the relational database management system 10 includes a command and query processing module 12. In general, the command and query processing module 12 receives and processes commands/queries. For instance, if an application residing on a client device (not shown) communicates a command to the relational database management system to generate a new database table, the command and query processing module 12 will receive the command, interpret the command, and then perform the necessary operations to execute the command (including allocating space) and generate the new table. Similarly, the command and query processing module 12 will process queries by identifying data in database tables that satisfy queries, and returning the query results to the query initiator.

The command and query processing module 12 includes a logic layer referred to herein as read/write logic 14. The read/write logic 14 performs database operations to read and/or write data to the database tables (not shown) residing on the volumes 16 on the storage device(s) 17 that are coupled to the relational database management system 10. For instance, when processing a query command, the read/write logic 14 will perform a read operation on the targeted database table. The relational database management system 10 includes lower-level logic—referred to herein as the input/output (I/O) manager 15—for handling the low-level commands used when reading from and writing to the storage devices 17. The read/write logic 14 operates in conjunction with the I/O logic 15 and the space allocation modules 18 and 20, which operate to allocate small pages and big pages, respectively. For instance, the space allocation module with reference 18 is configured to utilize a logical space allocation technique for allocating small pages in a designated portion of converter-managed space 22 in the volumes 16 of the storage devices 17. Accordingly, the space allocation module with reference 18 includes a converter module 22 for managing a converter table (not shown) that maps physical small page addresses to logical small page addresses. In addition, the space allocation module 189 includes a free block manager 24 for managing the states of allocated small pages. Similarly, the space allocation module with reference 20 is configured to use a physical space allocation technique for allocating big pages in a designated portion of space 28 managed by the object directory manager 30. The space allocation module with reference 20 also includes its own free block manager 32 for managing the states of the allocated big pages in the object directory managed space 28. In some embodiments, the converter-managed space 22 represents one or more volumes designated for use with the converter module 24, such that space allocated within those volumes is allocated in units of a size consistent with the small pages. The object directory managed space 28 represents volumes designated for use with the object directory manager 30 and will have space allocated in big pages.

As illustrated in FIG. 1, there are two space allocation modules—a first space allocation module for the allocation of small pages, and a second space allocation module for the allocation of big pages. In an alternative embodiment, the two space allocation modules may be represented as a single module. Furthermore, the logic, modules and managers illustrated in FIG. 1 represent software instructions which will typically be stored in memory and executed by hardware (e.g., a processor), or some other application specific processor. Accordingly, at a particular moment in time, or during a certain duration of time, when a particular set of software instructions are being executed by one or more processors, the combination of the software instructions and the specific hardware executing the software instructions may be thought of as representing a logic, module or manager, as illustrated herein. It is of course possible that one or more of the logics, modules and/or managers may be implemented in hardware or firmware, in a particular implementation.

Figure 2:
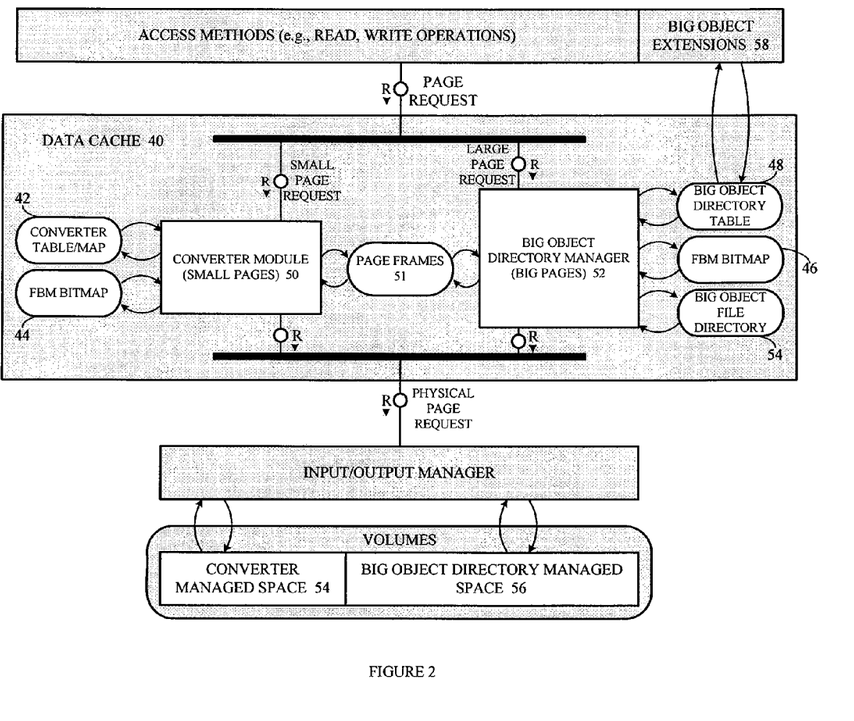
FIG. 2 is functional block diagram illustrating an example of a data cache and related functional and structural components included in a database management system consistent with an embodiment of the invention.

FIG. 2 is functional block diagram illustrating an example of a data cache 40 and related functional and structural components included in a database management system consistent with an embodiment of the invention. In FIG. 2, the data cache 40 represents a portion of memory dedicated for use by certain structural components of the relational database management system, when the system is in operation. For example, the page frames module 51 represents the portion of the data cache 40 used for storing cached logical pages—specifically, cached small pages. In addition to being used to temporarily store logical pages (including shadow pages), the data cache 40 is used to store and manage certain structural components of the database system, such as: the converter table or map 42, used to map logical page addresses to physical page addresses for small pages; the free block manager (FBM) bitmaps 44 and 46, used to manage the states of pages (small and big); the big object directory table 48, used in managing the physical allocation of big pages; and the big object file directory 54, used to manage big objects comprised of allocated big pages. In FIG. 2, the converter module 50 and the big object directory manager 52 are shown to reside in the data cache 40 for the purpose of conveying an understanding of the relationship between the various functional and structural components of the system. Furthermore, in FIG. 2, the converter module 50 is presumed to encompass the logic (equivalent to the free block manager 26 in FIG. 1) for managing the free block manager bitmap 44 that is used to maintain the state of pages in converter managed space 54. Similarly, the object directory manager 52 is presumed to encompass the logic (equivalent to the free block manager 32 in FIG. 1) for managing the free block manager bitmap 46 used in maintaining the states of pages in the big object directory managed space 56.

In one embodiment, to support converter-less page allocation for big pages, a set of data volumes are defined for use with big object containers—that is, data containers, such as tables and indices, for use with space allocated in big pages. For instance, in FIG. 2, the big object directory managed space 56 is designated for use with volumes that are configured for use with big pages. The big pages allocated in the designated space 56 comprise big object containers, such as tables and indices, and possibly other data containers, for some implementations. Accordingly, the big object directory managed space 56 (and corresponding volumes) are not used or accessed by the converter module 50 or the free block manager used to maintain the states of small pages. The converter module 50 and the free block manager for small pages (not shown) perform the logical space allocation operations necessary for allocating and managing small pages in the converter managed space 54. In some embodiments, new volumes within the converter managed space 54, or within the big object directory managed space 56, can be added and/or deleted on demand.

In one embodiment, for the allocation of big pages in the big object directory managed space 56, a second free block manager (e.g., free block manager 32 in FIG. 1) and free block manager bitmap 46 are utilized. Accordingly, the free block manager for use with big pages assigns units of space in big sizes, for example, on the order of magnitude 256 MB per unit in one embodiment. In certain applications, such as RFID applications, the big object containers (e.g., the data storage entities or containers, such as, tables, indices, and so on) will likely be significantly larger (e.g., by an order of magnitude) than the size of a big page. Consequently, aligning the allocation to this size (e.g., 256 MB) will result in little additional overhead cost.

In some embodiments, the free block manager for big pages (e.g., free block manager 32 in FIG. 1) will operate in much the same manner as the free block manager for small pages (e.g., free block manager 26 in FIG. 1), with some minor differences. In one embodiment for example, a big page can be in one of the following states: "FREE", "USED" and "FREE AFTER SAVEPOINT". The state, "FREE AFTER SAVEPOINT", indicates that the big page is to be transitioned to the state, "FREE", after the next savepoint operation is completed successfully. A state map 70 for the allocation of big pages is illustrated in FIG. 3.

Figure 3:
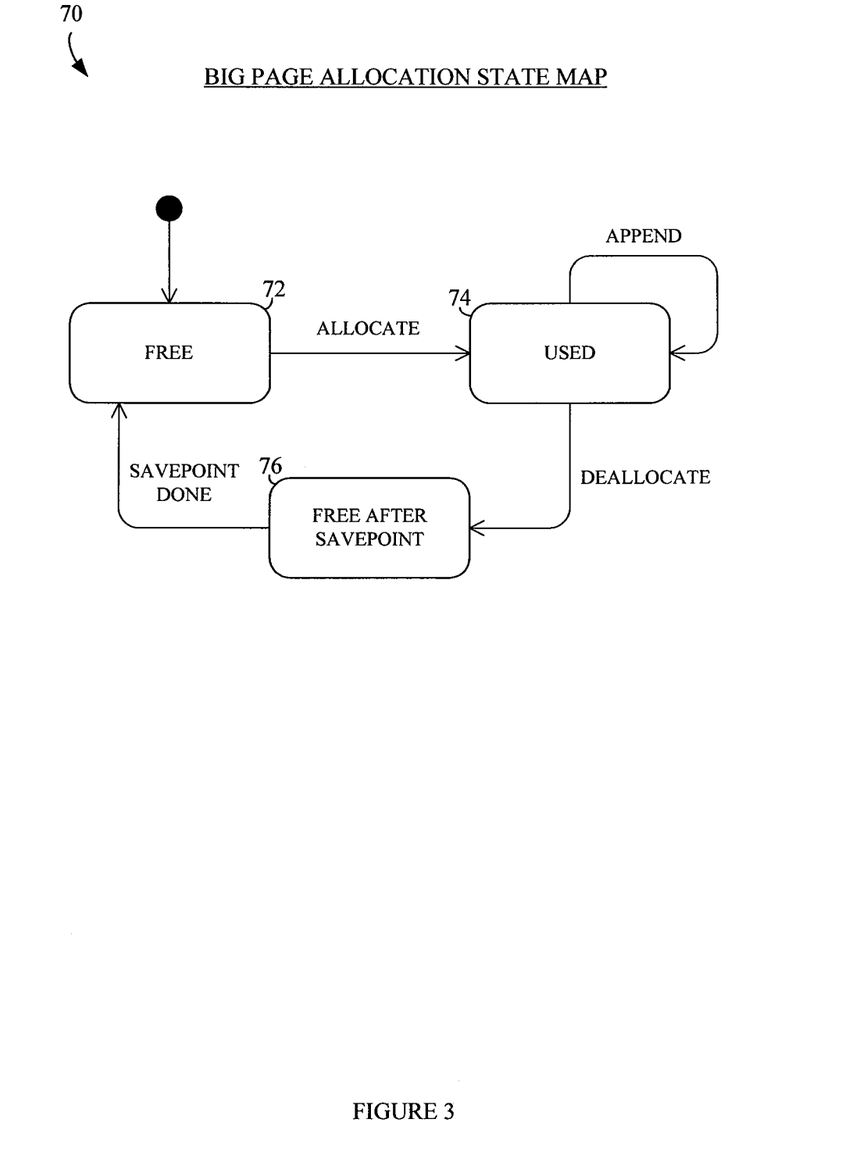
FIG. 3 is a block diagram illustrating a state map for the possible allocation states of an allocated unit of space referred to herein as a big page, according to an embodiment of the invention.

Referring to FIG. 3, upon initialization the state of a big page is set to "FREE" 72 as indicated in the state map 70. Once a big page is allocated for use with a big object container, the state of the big page transitions to "USED" 74. Because a big page cannot be updated, but only appended, the state of a big page remains "USED" until the big page is deallocated, at which time the state of the big page transitions to "FREE AFTER SAVEPOINT" 76. Finally, upon the successful completion of a savepoint operation, the state of the big page transitions back to "FREE" 72.

In contrast to small pages, which may transition from state, "USED", to a "SHADOW" state (e.g., indicating a shadow page), a big page will never be in a "SHADOW" state as the access method extensions for big object containers (e.g., big object extensions 58 in FIG. 2) only include access methods that provide for appending data to a big page or big object. Therefore, it will never be the case that a previously allocated big page will be updated to store new data. Instead, only append operations are supported with big pages and big objects. Accordingly, whereas the free block manager for small pages (e.g., free block manager 26 in FIG. 1) includes a state "SHADOW" that is used for old page images of pages modified or deallocated in a current savepoint cycle, a big page does not have such a transition or state. Big pages can only be appended. Thus, when processing an append operation, there will be no new physical big page assigned to the logical big page and the page stays in the state, "USED". Only the affected small pages touched by the current append operation will be marked as dirty, to be flushed asynchronously (at the latest, during the next savepoint operation). Only when the whole big page is deallocated will the state of a big page transition to "FREE AFTER SAVEPOINT," which is similar to the state "SHADOW" for a shadow page. The "FREE AFTER SAVEPOINT" state recognizes that a big page is needed as long as no new savepoint operation has completed. If, for example, a system crashes, without the big page maintained in the state, "FREE AFTER SAVEPOINT", there would be no way to recover the data subsequent to the crash. Similarly, if a big page would transition to state, "FREE", immediately upon being deallocated, the big page might be reused elsewhere and still-relevant data for recovery purposes would be overwritten.

Referring again to FIG. 2, in some embodiments, for each big object container, a set of big pages, or possibly several ranges of big pages, are allocated. The information necessary for managing and maintaining the big object container is stored in the data cache 40 within the big object directory table 48. The free block manager bitmap 46 for big pages can be reconstructed by initializing all pages to "FREE" and then iterating over the big object directory table 48 to identify and mark all referenced big pages, or ranges of big pages, as "USED".

In some embodiments, the big object directory table 48 is itself stored in converter-managed space (i.e., as small pages allocated using a logical allocation method) and is made to be consistent with the savepoint operations. In one implementation, a non-logged standard query language (SQL) table is used for the big object directory table 48. The data is cached in memory for fast access, with any changes being propagated to the underlying table. In effect, the big object directory manager 52 is the "converter" for big pages with a somewhat different structure and method of operation, when compared with its counterpart for small pages (i.e., converter module 50). Whereas the converter module 50 for small pages manages a converter table 42 that contains only a mapping of physical page addresses or references to logical page addresses or references, in some embodiments each entry or record in the object directory table 48 contains the following information: big object container identifier (ID); a big page offset, indicating the position within the big object container; big page range start; and, big page range end. Accordingly, in some embodiments, an entry in the big object directory table is in the form of a 4-tuple with each item corresponding to an item of information as set forth above.

In some embodiments, for example, each big object will have one or more entries or records in the big object directory table 48. For instance, the big page offset is needed in order to do relative addressing of the data within a big object container. It also defines or indicates the correct order of big pages in the big object container. For instance, the whole big object can be "pieced" together by iterating all page ranges of the big object ordered by big page offset. By comparing the big page offset, it is possible to find the proper big page (or page range) in which to look for a requested small page.

By way of example, assume that each big page is equivalent in size to 1000 small pages, and the following pair of 4-tuples are stored in the big object directory table 48: (1, 0, 10, 19) and (1, 10, 200, 209). To reference the small page at address 12345 inside of the big object with big object container ID equal to "1", it will first require computation of the big page offset as, (12345/1000=12). Therefore, the big page offset is "12". Then, the proper directory entry is selected—that is, (1, 10, 200, 209). The physical start of this page range is big page 200, whereas the logical start inside the big object is big page 10. Therefore, to access the small page with reference 12345, we need to access the big page at the reference calculated as, (200+12−10=202). The offset of the small page 12345 within big page 202 is (12345% 1000=345). So in order to read/write small page 12345 in big object with big object ID equal to "1", we need to access the $345^{th}$ small page in big page 202. Similarly, if small page offset 23456 is requested, we can see that big page 23, (23456/1000=23), is not part of the big object anymore, so an error will be reported.

As the big object directory table 48 will itself be stored in the converter-managed space 54, modifications made to the directory table 48 are effectively persisted with the savepoint—just as with the converter table 42 managed by the small pages converter 50. In some embodiments, the actual big object implementation will log space allocation and deallocation (which modify the big object directory table 48) in a write-ahead log, similar to conventional operations with the converter module 50.

Because the big object directory table 48 contains the big object ID for each big object, there is no need for additional chaining of big pages inside a big object. All big pages comprising a big object can be iterated quickly and/or any small page within the big object can be identified quickly by utilizing the small page offset, as shown in the above example. Furthermore, to facilitate in-container data allocation and deallocation, a pointer is provided to point to the beginning of free space for the next in-container data allocation, and to the beginning of used space for later deallocation, from the container beginning (both pointing to a byte offset inside of the big object). Thus, in addition to the big object directory table 48, a second table, referred to herein as the big object file directory 54, is provided to maintain these pointers. As with the big object directory table 48, in one embodiment, the big object file directory 54 is implemented as a non-logged SQL table that is made consistent with savepoint operations.

In some embodiments, some additional information about each big object is maintained in the big object file directory 54. For example, in some embodiments, each big object has a type, which is identified in the big object file directory 54. In the context of an RFID application, the type of each big object may be a data container, for example, such as a database table, or an index, implemented as a tree. Accordingly, in one embodiment, for each big object, the big object file directory 54 includes the following information: the big object container identifier (ID), the big object type, the allocation pointer (for allocating data within the big object), and the deallocation pointer (for use within the big object).

In some embodiments, a variety of space management operations for big objects are supported. For instance, as indicated in FIG. 2, the space management operations for big objects extend the traditional space management operations for small pages. In FIG. 2, these additional space management operations are illustrated as big object extensions 58 that are particularly suited for big objects. In one embodiment, the big object extensions 58 support a space management operation for allocating big pages, or bytes at the end of a big page. Similarly, an operation to free big pages, or bytes from the beginning of a big page, is supported. Allocating new pages or bytes might cause extending the big object by further big page(s). Accordingly, in some embodiments, the allocation operations support the allocation of several big pages at one time. For instance, when it is known in advance approximately how much data is going to be written into the big object, a single big page range can be pre-allocated to the big object instead of allocating separate big pages as the big object grows. This keeps the size of the big object directory table 48 to a minimum as fewer entries are required, and limits the number of space allocation operations that need to be processed. Of course, space can only be allocated in the portion of space dedicated for use with the big object directory manager 52 if the free block manager bitmap 46 indicates that big pages within the object directory managed space 56 are available.

The operations to free big pages or bytes will take the first small page or byte offset to retain, and drop all older pages. This makes it easy for the implementation of actual big object containers to free up space, up to a certain offset, without copying the data in the big object. Because each entry in the big object directory table 48 for each separate big page (range) contains a starting offset within the big object, "cutting" from the beginning will effectively make cut pages inaccessible. In some embodiments, the operations responsible for the allocation and deallocation of big pages will log the allocation/deallocation appropriately. In combination with the big object directory table 48, which is effectively persisted on savepoint, the full recoverability of changes is possible.

Figure 4:
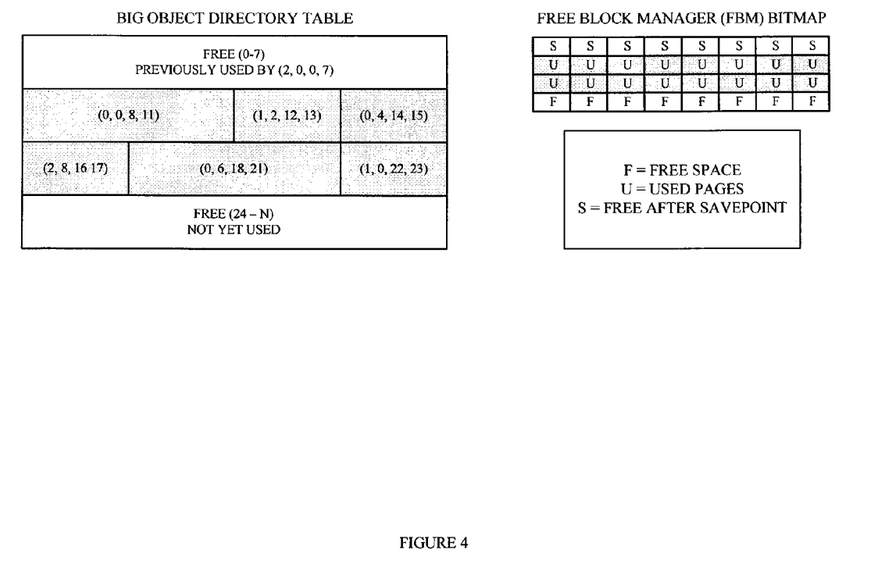
FIG. 4 is a block diagram illustrating an object directory table and a free block manager bitmap, according to an embodiment of the invention.

Turning now to FIG. 4, a block diagram illustrating a big object directory table 48 and a free block manager bitmap 46, according to an embodiment of the invention, are shown. In this example, there are three big objects with big object ID's 0, 1 and 2. As described above, each 4-tuple in the big object directory table represents the following: object ID, big page offset, start of big page range, end of big page range. Each entry in the FBM bitmap on the right side contains a letter to indicate the state of a corresponding big page. For purposes of this example, the various states are represented as: "F" for free space, "U" for used pages, and "S" for free after savepoint. It will be appreciated that other symbols may be used to identify the states, in various embodiments.

From the example in FIG. 4, it can be seen that the big object with big object ID "0" is divided into three big page ranges, as such, 8-11, 14-15 and 18-21. The first big page range represents pages 0-3, while the second big page range represents pages 4-5 and the third, 6-9, counted from the beginning of the big object.

Also from the example in FIG. 4, it can be seen that the big object with big object ID "1" is divided into two big page ranges, 22-23 and 12-13. The first big page range represents pages 0-1, while the second big page range represents pages 2-3.

Finally, from the example big object directory table in FIG. 4, it can be seen that the big object with big object ID, "2", was cut off at the beginning (8 big pages) in the current savepoint cycle. The state of the pages, as indicated in the FBM bitmap, are not yet freed, but will be free after the completion of the next successful savepoint operation. The big page range 16-17 represents still existing pages 8-9, while pages 0-7 have just been deleted and cannot be addressed anymore.

In some embodiments, the pair (big object ID, and small page number) effectively describe the logical address of a page within a big object. Accordingly, these two numbers can be combined together into one page number. For example, if in a particular implementation, the page number is expressed as an 8 byte integer, the first 3 bytes can be specified to represent the big object ID, while the latter 5 bytes represent the small page offset within the big object. In this example, this would allow for 8192 Terabytes for each big object at an 8 Kilobyte page size and 16 Million big objects in total. In addition, logical pages can be expressed as an integer as well.

In some embodiments, the data cache 40 will only cache small pages, and the small page portions of certain big pages in its page frames 51. For instance, when a request for a given page number is for a small logical page or for big page, this information is passed along with the page number. Accordingly, the data cache is able to cache parts (small page portions) of big pages without any further adjustments. For example, in one embodiment, where the relational database management system is an implementation of SAP MaxDB, such additional information is already passed along in a mode, referred to as the "recovery mode." This information currently enables the system to distinguish between permanent pages, temporary pages and pages for C++ OODB extension OMS. Accordingly, consistent with an embodiment of the invention, a mode similar to the existing "recovery mode" is implemented for big pages of big objects, which would then invoke the proper code path for logical-to-physical lookup. This also makes it possible to use big object space allocation even for existing containers, with some limitations. For example, since there are no shadow pages, only append operations are possible, but no data update operations.

By adding support for big objects to a conventional shadow pages database system, two separate data spaces may exist— one for classical converter-managed objects and one for big objects. If either of the data spaces becomes full, the database might stop. While this might confuse some users, many database systems (e.g., Oracle) use manually-configurable table spaces. Accordingly, administrators of such databases are generally familiar with this type of problem. However, with conventional databases that utilize shadow pages and converter technology (e.g., such as SAP MaxDB), this problem does not typically occur. Therefore, administrators of such systems will not generally be familiar with such problems and the effect of having two data spaces may increase the total cost of ownership for the user.

To avoid such a scenario, in one embodiment, the regular converter managed space is allocated as a single big object within the big object space (e.g., the big object directory managed space 56 (in FIG. 2)), thus leaving only a single data space. However, because the big object directory table is to be consistent with savepoint operations (and thus reside in converter-managed space), there might exist a circular definition, or chicken-and-egg problem. This issue can be resolved by converting the allocated big object logical page range to physical page range and addressing of the underlying pages using physical page numbers instead of big object page offsets. For instance, for each allocated big page, a FBM block is built, which identifies the logical offset in a big object and physical offset on the disk. Using this approach, the converter may be initialized correctly on restart and the object directory table may initialize itself afterward from converter managed space. Using this solution, there will be no increase in the total cost of ownership when using big objects, since the space distribution will be managed automatically.

In some embodiments, to provide on-line backup in databases using converter managed space, the pages which need to be backed up are first marked as backup-relevant. Backup-relevant pages are not freed, until the backup finishes. Accordingly, even when the backup takes a long time and several savepoints are executed during the backup procedure, the pages referenced will not disappear and can be copied out of the system consistently. This is no different for big pages—each backup-relevant big page is marked as well and cannot be reused until backup finishes. The backup function then copies marked big pages to backup media. The only difference is that the data in affected pages may be appended during backup. This poses no problem, though, since from the logical perspective, the data coming in are behind the allocation pointer of the big object, thus not yet known in backup-relevant consistent state.

Furthermore, the backup procedure in some embodiments can be optimized. For example, since a big object can only grow at the end when appended, and cannot be modified afterwards, by maintaining the last backed up position within the big object, only a single pointer per big object is required for backup purpose. For example, a single pointer pointing to the last page backed up will suffice. The pointer for the big object can be stored in the big object file directory. Furthermore, because the backup procedure for big pages is essentially the same as it is for small pages, allocated logically, the implementation of the big pages does not increase the total cost of ownership for the database system.

Another advantage of converter-based systems that is maintained, even with the introduction of the big pages implementation described herein, is data rebalancing. The use of a converter module and corresponding converter table in database systems enables very easy data rebalancing on volumes, which can be done in the background. Thus, the database system is reorganization-free. If a block is moved from one physical location to another, the converter simply updates the entry for the block in the converter table to point to the block's new location. With the introduction of big objects, rebalancing is still possible. Because the big object directory manager is effectively also mapping ranges of logical pages to ranges of physical pages. The data can be rebalanced to a new volume in a similar way as for the regular converter-based system, only append on the big page just being rebalanced needs to be synchronized with rebalancing operation.

Figure 5:
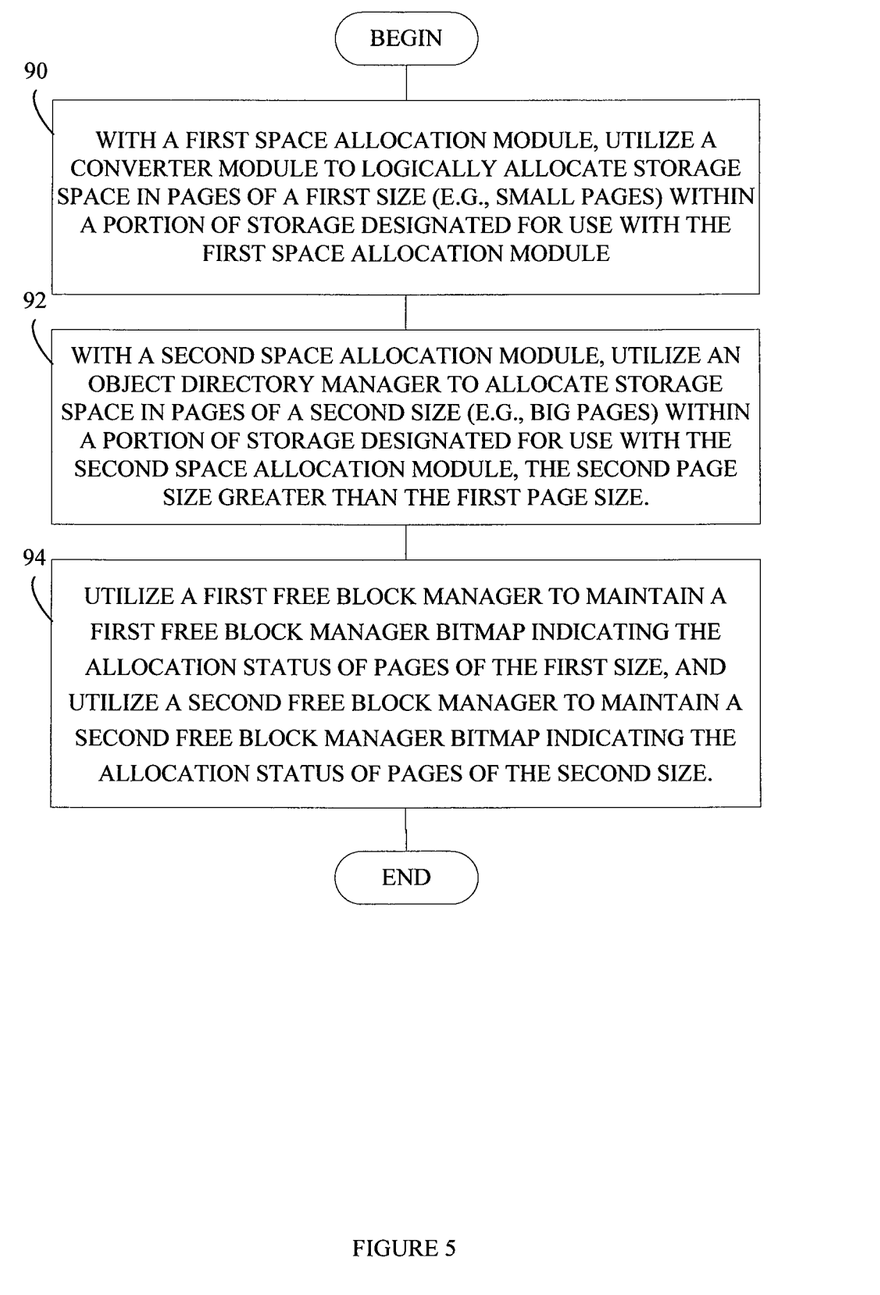
FIG. 5 is a flow diagram illustrating the method operations involved in a method, according to an embodiment of the invention, for managing allocated space for a relational database management system.

Turning now to FIG. 5, a method of managing space for large write-once database tables, according to an embodiment of the invention, is shown. At method operation 90, a converter module of a first space allocation module allocates storage space in pages of a first size (e.g., small pages) within a portion of storage that has previously been dedicated for use by the first space allocation module. For example, such a designation indicates that the portion of space managed by the converter modules is to be allocated with small pages. Next, at method operation 92, a second space allocation module, using a big object directory manager, allocates storage space in pages of a second size (e.g., big pages) within a portion of storage designated for use with the big object directory manager. Finally, at method operation 94, two free block managers maintain two different free block manager bitmaps—the first bitmap to maintain the states of small pages allocated in the converter managed space, and the second bitmap to maintain the states of the big pages allocated in the big object directory managed space. Other operations may involve allocating and deallocating big pages within an object and updating the corresponding entries in the object directory table and/or object file directory.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, logic or managers, that operate to perform one or more operations or functions. The modules, logics and managers referred to herein may, in some example embodiments, comprise processor-implemented modules, logics or managers.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 6:
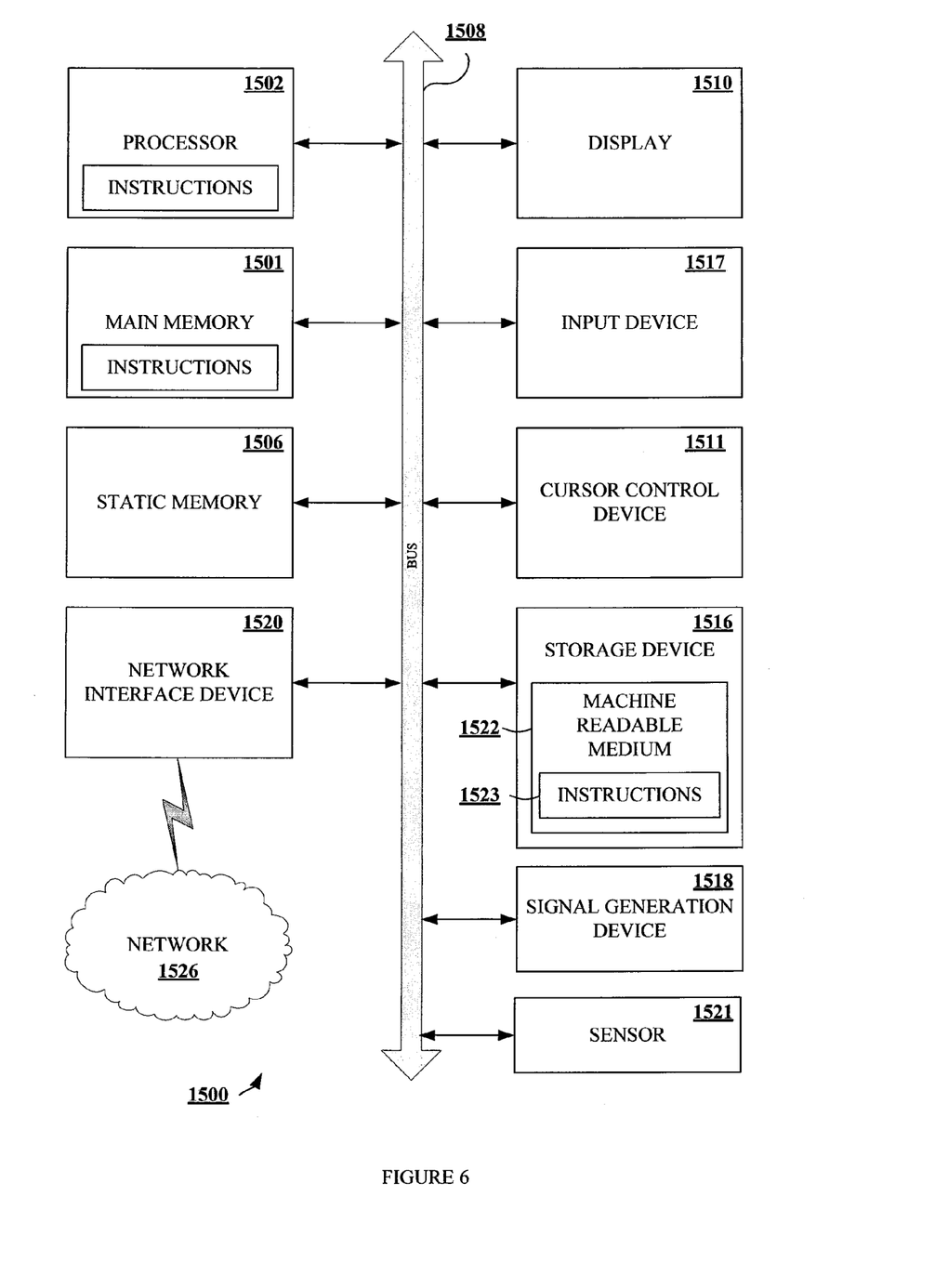
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled

What is claimed is:

1. A relational database management system for archiving Radio Frequency Identification (RFID) data, the system comprising:
    a command and query processing module configured to receive and process data requests for data including RFID data, the command and query processing module including a logic layer for reading, writing and updating data stored, within a database table having pages of a first size, and performing a write-once operation to write data to a write-once database table having pages of a second size greater than the first size, the pages of the first size allocated and addressed logically with use of a converter to map logical pages to physical pages, and the pages of the second size allocated physically and addressed logically with use of a big object directory manager.

2. The relational database management system of claim 1, wherein the data written to the write-once database table is data that has been obtained via an RFID reader associated with an RFID application, the MD application having data storage specifications that require RFID data written to the write-once database table to be searchable, but not updatable.

3. The relational database management system of claim 1, wherein the pages of the second size are greater in size than the pages of the first size by an integer multiple.

4. The relational database management system of claim 1, further comprising:
    a first free block manager to use a first free block manager bitmap to manage the allocation state of the pages of the first size; and
    a second free block manager to use a second free block manager bitmap to manage the allocation state of the pages of the second size.

5. The relational database management system of claim 1, further comprising:
    a data cache to store and manage shadow pages and to enable copy-on-write operations for data written to tables stored in pages of the first size.

6. A computer-implemented method comprising:
    at a relational database management system having at least one database table stored in pages of a first size and at least one write-once database table stored in pages of a second size greater than the first size by an integer multiple, receiving a first command from an REID application executing on a client computing device; and
    processing the command to append RFID data received with the command to a write-once database table stored in pages of the second size, the pages of the second size allocated physically and addressed logically with use of a big directory object manager.

7. The computer-implemented method of claim 6, wherein the data appended to the write-once database table is data that has been obtained via an RFID reader associated with an RFID application, the REID application having data storage specifications that require RFID data appended to the write-once database table to be searchable, but not updatable.

8. The computer-implemented method of claim 6, further comprising:
    receiving a second command; and
    in accordance with the second command, processing a write operation to write data to a database table stored in pages of the first size, the pages of the first size allocated and addressed logically with use of a converter to map logical pages to physical pages.

9. The computer-implemented method of claim 8, further comprising:
with a first processor-implemented free block manager, updating one or more bits in a first free block manager bitmap to reflect a status of a page of the second size as a result of processing the first command; and
with a second processor-implemented free block manager, updating one or more bits in a second free block manager bitmap to reflect a status of a page of the first size as a result of processing the second command.

10. The computer-implemented method of claim 9, further comprising:
with the first processor-implemented free block manager, setting or clearing one or more bits in the first free block manager bitmap to change the state of a previously allocated, unused page of the second size, thereby automatically reclaiming the previously allocated, unused page of the second size; and
with the second processor-implemented free block manager, setting or clearing one or more bits in the first second block manager bitmap to change the state of a previously allocated, unused page of the first size, thereby automatically reclaiming the previously allocated, unused page of the first size.

11. A system for archiving radio frequency identification (RFID) data, the system comprising:
a plurality of RFID readers for obtaining RFID data from RFID tags; and
a relational database management system having a command and query processing module configured to receive and process data commands for RFID data, the command and query processing module including a logic layer for reading, writing and updating RFID data stored within a database table having pages of a first size, and performing a write-once operation to write data to a write-once database table having pages of a second size greater than the first size, the pages of the first size allocated and addressed logically with use of a converter to map logical pages to physical pages, and the pages of the second size allocated physically and addressed logically with use of a big object directory manager.

12. The system of claim 11, wherein the RFID data written to the write-once database table is RFID data that has been obtained via an RFID reader associated with an RFID application, the RFID application having data storage specifications that requires RFID data written to the write-once database table to be searchable, but not updatable.

13. The system of claim 11, wherein the relational database management system further comprises:
a first free block manager to use a first free block manager bitmap to manage the allocation state of the pages of the first size; and
a second free block manager to use a second free block manager bitmap to manage the allocation state of the pages of the second size.

14. The system of claim 11, wherein the relational database management system further comprises:
a data cache to store and manage shadow pages and to enable copy-on-write operations for data written to tables stored in pages of the first size.

15. A system for archiving radio frequency identification (RFID) data, the system comprising:
a plurality of RFID readers for obtaining RFID data from RFID tags; and
a relational database management system comprising:
a first space allocation module configured to allocate storage space in pages of a first size, the first space allocation module having (i) a converter module configured to use a converter map to map logical pages to physical pages, and (ii) a free block manager configured to manage the allocation status of each page of the first size, the physical pages of the first size being allocated in one or more volumes dedicated for use by the first space allocation module; and
a second space allocation module configured to allocate storage space in pages of a second size greater than the first size, the second space allocation module having (i) an object directory manager configured to use an object directory table to map object containers to physical pages of the second size, and (ii) a free block manager configured to manage the allocation status of each page of the second size, the physical pages of the second size being allocated in one or more volumes dedicated for use by the second space allocation module.

16. The system of claim 15, wherein RFID data obtained by an RFID reader is written, in a first time period, to a database table having pages of the first size allocated by the first space allocation module, and in a second time period subsequent to the first time period, the RFID data is appended to a second database table having pages of the second size allocated by the second space allocation module.

17. The system of claim 15, wherein the first and second space allocation modules are operable to process read and write operations received via a common interface and to direct input and output commands to a common secondary storage via a common interface.

18. The system of claim 15, wherein the free block manager of the first space allocation module is configured (i) to set the allocation status of the newly allocated physical page of the first size to a status that indicates the newly allocated physical page is allocated, and (ii) to set the status of the old physical page of the first size to a status that indicates the old physical page is a shadow page.

19. The system of claim 15, wherein the second space allocation module is further configured to perform an append operation to append data to a physical page of the second size when processing a write operation directed to a previously allocated physical page of the second size.

* * * * *